United States Patent Office 3,531,393
Patented Sept. 29, 1970

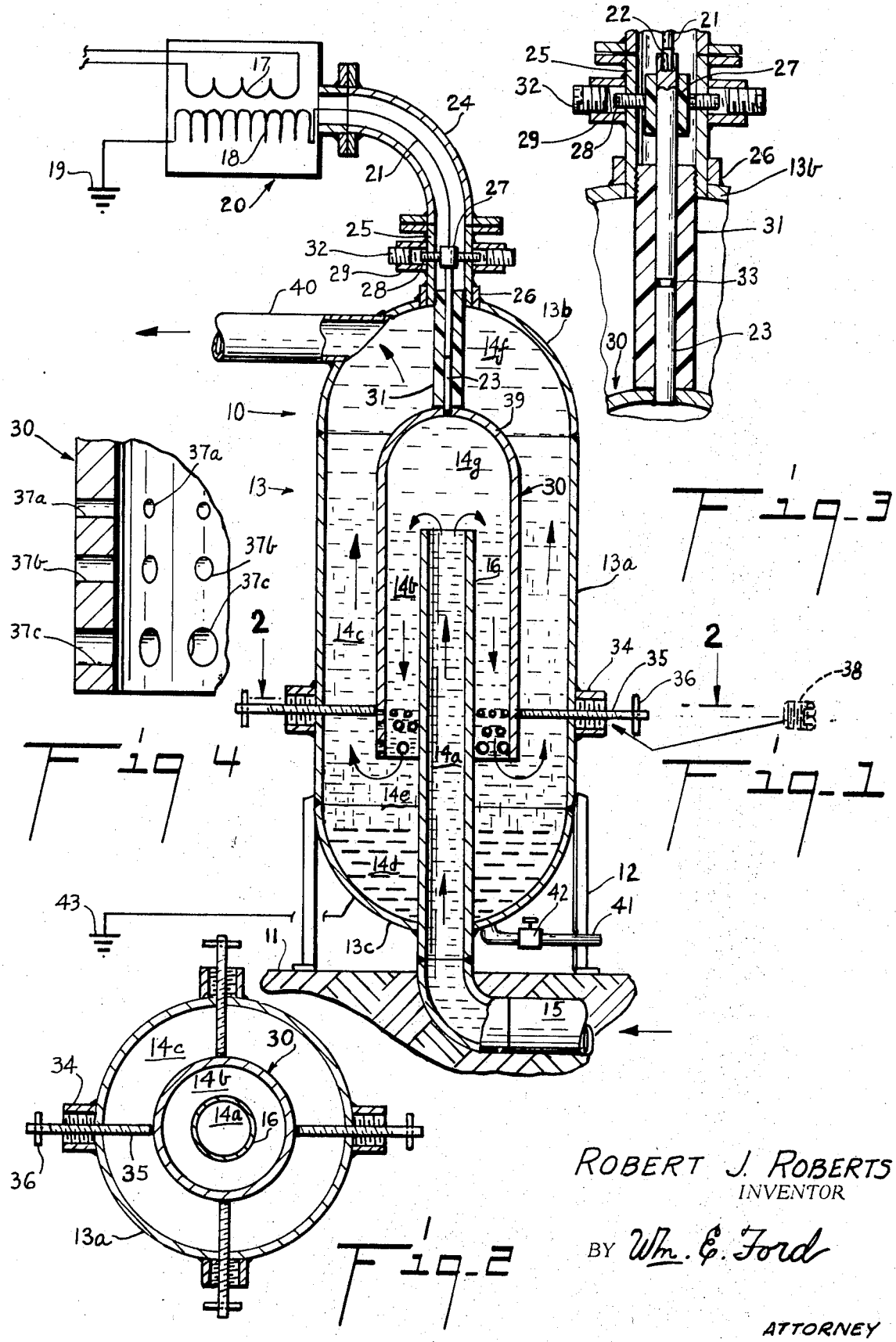

3,531,393
ELECTRICAL DE-EMULSIFIER FOR PETROLEUM CARRYING EMULSION
Robert J. Roberts, 9833 Moyers, Houston, Tex. 77042
Filed Jan. 2, 1968, Ser. No. 694,619
Int. Cl. B01d 17/04, 17/06
U.S. Cl. 204—302        10 Claims

ABSTRACT OF THE DISCLOSURE

The invention provides a de-emulsifier for petroleum carrying emulsions which comprises a central, grounded emulsion inlet tube, and a pressure vessel shell constructed with concentricity therearound, and suspends a bell-shaped electrode, open end down, intermediate the inlet tube and the shell, such electrode being mechanically adjustable for substantially exact concentric disposition between inlet tube and shell, the emulsion thus following a continuous path subjected to substantially equal potential gradient from the top of inlet past the lower, or open end of the bell and back upwardly to the vicinity of discharge.

---

The invention relates to emulsion treatment, as the de-emulsification of emulsions, and mainly to the treatment of emulsions carrying a high petroleum content; the lighter, primary volume of the petroleum being passed upwardly to a discharge, as the heavier, secondary volume of water settles to the bottom of the treatment vessel and below the space in which electrical de-emulsification is being carried out.

As a primary object the invention provides for the disposition of a highly powered electrode, adjustable to substantially exact concentricity between a tubular inlet inwardly and the grounded shell of a tubular pressure vessel outwardly of such electrode.

It is also an important object of the invention to provide for a de-emulsifier of this class which may be constructed from empirical data as to efficiency of separation of constituents of various emulsions, considering factors of radial distance or of volumetric flow between a highly powered electrode adjustably disposable with substantially exact concentricity around an emulsion inlet pipe inwardly thereof and within a tubular pressure vessel outwardly thereof.

It is still another object of the invention to provide a de-emulsifier of this class in which the voltage gradient between pressure vessel shell and powered electrode, and between powered electrode and inlet tube or pipe may be predetermined on basis of voltage gradient per radial inch or on basis of rate of volumetric flow of the emulsion.

It is also another important object of the invention to provide a de-emulsifier of this class which incorporates mechanically adjustable means for concentric disposition of the highly powered electrode by centering the bell suspending an insulated rod electrode with relation to a tubular member centrally installed on top of the pressure vessel.

It is an additional object of the invention to provide means for holding the lower part of the bell concentrically disposed with relation to the pressure vessel and inlet tube, as, for instance, against displacement to an eccentric position during transit.

It is another additional object of the invention to provide increasingly larger diameter and greater area perforation in the lower part of the bell electrode, beginning with the smallest diameter perforations several inches above the bottom of the bell, thus to provide for the emulsion passing the lower end portion of the bell electrode and turning upwardly without the emulsion having to pass through a space of lesser potential below the bottom of the bell.

Other and further objects will be apparent when the specification herein is considered in connection with the drawings, in which:

FIG. 1 is a sectional elevational view; partially diagrammatic, showing a de-emulsifier adapted to carry out the teaching of this invention;

FIG. 2 is a sectional plan view, taken along line 2—2 of FIG. 1;

FIG. 3 is an enlarged, fragmentary, sectional elevational view, showing structures above the top of the bell in larger detail; and FIG. 4 is an enlarged, fragmentary, sectional elevational view showing perforation details in the lower portion of bell shaped electrode.

Referring now in detail to the drawings in which like reference numerals are assigned to like elements in the various views, a treater or de-emulsifier 10 is shown in FIG. 1 as supported above the ground 11, or preferably above a base, not shown, by support legs 12. The treater or de-emulsifier 10 has a conventional pressure vessel shell or casing including a cylindrical main shell 13a, with a dome shaped top 13b thereabove, and a dish shaped bottom 13c therebelow.

The entering emulsion 14a, in which petroleum, in majority, has water emulsified therein, is shown supplied through a ground conduit 15 to rise in an inlet pipe or tube 16. Electrical power, as from any conventional source, as 110, A.C. source is indicated as being impressed across the primary coil 17 of an electrical, step-up transformer 20 with secondary coil 18 designed to step up the voltage to substantially say 5,000 volts. One end of the secondary coil 18 is shown in FIG. 1 as grounded at 19, while the other end is extended as an insulated conductor 21 through an elbow 24, the conductor 21 terminating in a conventional, centrally bored and side-slotted plug 22. Such plug 22 is press-fitted through the neck of a frustoconical shaped space bored and reamed in the top of a metallic rod electrode 23.

The elbow 24 connects the transformer 20 with a flanged nipple 25 upstanding from within a nipple 26 comprising the top central member of the pressure vessel treater or de-emulsifier casing 13. The rod electrode 23 extends through a cylindrical insulative block 27 which is centered within the flanged nipple 25 by Allen head setscrews 28, three or more being equally angularly spaced around the block 27 as they extend radially outwardly, as threaded through the wall of the nipple 25. Nipples 29 are installed upon the flanged nipple 25 concentrically around the Allen head setscrews 28. The nipples 29, internally threaded, may have externally threaded plugs 32 threaded thereinto to protect the Allen head setscrews 28.

The flanged nipple 25 has its lower end internally threaded to receive the externally threaded upper end of an insulative sleeve 31, as of plastic, through which the rod electrode 23 extends to be rigidly connected at its lower end to the bell shaped electrode 30, as the lower end of the plastic sleeve 31 seats upon top of the bell.

The rod electrode 23 has a groove formed therein to receive an O-ring 33 to form a seal against leakage upwardly or downwardly thereby. As the rod electrode 23 is rigidly connected to the bell shaped electrode 30, and as the surrounding insulative sleeve 31 is connected into the lower end of the flanged nipple 25, the manipulation of the Allen head setscrews 28 against the insulative adjustment block 27 may shift any slight angle at which the axis of the rod electrode 23 and the bell shaped electrode 30 may extend to the vertical, or to the substantially upright or vertical axis through the center of the inlet pipe 16. Thus the bell shaped electrode 30 can be adjustably disposed to extend with substantially exact concentricity about the inlet pipe 16. Also, ipso facto, this adjustment will dispose the bell shaped electrode 30 with concentricity within the pressure vessel cylindrical shell, central member 13a, as the shell for casing 13 is fabricated to extend with concentricity about the inlet pipe 16.

Noticeably there is thus provided a space between bell and inlet, through which the emulsion first passes and during such passage the water content of the emulsion first begins to be broken down and coalesced, the emulsion in this stage of treatment being indicated by the reference numeral 14b. During this period the emulsion can be subjected to the heaviest impressed voltage per radial inch, or the heaviest, impressed voltage per unit of annular space between inlet pipe 16 and bell 30.

It should be noticed that internally threaded nipples 34 are indicated as welded on the outer periphery of the shell 13a, four equally angularly spaced apart nipples 34 being indicated in FIG. 2. Bolts or studs 35 are threaded to pass radially through the wall of the shell 13a, with the nipples 34 disposed concentrically thereabout, the bolts or studs 35 extending inwardly to bear against the outer surface of the bell shaped electrode 30.

As designed the bell shaped electrode 30 is to be centered exclusively through manipulation of the setscrews 28 against the plastic adjustment block 27, while the bolts or studs 35 are later set up against the bell shaped electrode periphery as a safeguard to hold the bell centered as adjusted during emergency, as in transit or during installation at a location. Small rods or tubes 36 are indicated in FIGS. 1 and 2 as being passed through the bolts or studs 35, to serve as handles. Since the bolts or studs 35 are metallic, they will have to be removed when the treater 10 is put in operation or otherwise the circuit will be shorted out through these elements. With the bolts or studs 35 removed before treatment starts, plugs 38 are provided, as indicated in dotted lines in FIG. 1, to be threaded into nipples 34 to close them against loss of contents through the bolt or stud holes through the walls of the shell 13a.

In order that the emulsion under early treatment 14b does not have to pass around the lower end of the bell 30 and thus into a space of lessened voltage impression, and of greater coalescence or water concentration, as indicated by the space 14e below the bell 30 and above the level of the precipitated water, 14d, the lower portion of the bell, as the lowest 5" thereof, is shown perforated in FIGS. 1 and 4. The perforations 37a, 37b, and 37c are provided in increasing size from uppermost to lowermost, thus to insure that substantially all of the emulsion passes through the bell and not around the lower end thereof.

The emulsion has lost some part of its water content by the time it begins upward passage between the bell 30 and the shell 13a and thus does not require the voltage concentration per radial inch or per unit of space that has been required through the first leg or downward passage of its transit through the treater or de-emulsifier 10. Thus, in cases the distance between the bell shaped electrode 30 and the cylindrical shell 13a may be greater than the distance between the bell and the inlet pipe 16.

On the other hand, where breakdown is at a slower rate, so that a greater part of coalescence takes place between bell 30 and shell 13a, the radial distance between bell 30 and shell 13a may be equal to the radial distance between bell 30 and inlet pipe 16. Or in cases where the entering emusion is of such a character that the voltage drop per space unit, area, or radial distance does not have to be comparatively as great as in other cases, a condition can exist where the distance between shell 13a and bell 30 may be less by design than the distance between bell 30 and inlet pipe 16.

Obviously a plurality of types of treaters or de-emulsifiers 10 may be stocked by a fabricator or supplier, catalogued by size and by relationship and proportions and dimensional considerations, particularly as regards shell, bell and inlet pipe.

The emulsion which passes upwardly between the shell 13a and bell 30 is in the stage 14c as indicated in FIG. 1, with greater and greater coalescence occurring as the water globules combine, and with greater and greater amounts of water passing downwardly as the petroleum content becomes more and more purified or dehydrated. Thus a space 14f is indicated as the upper space within the pressure vessel 13 which is substantially free of water, and thus substantially dehydrated petroleum oil.

In passing it may be noted that a space 14g may develop within the top or bell portion 39 of the bell shaped electrode 30 in which petroleum oil may collect by gravity above the top of the inlet pipe 16 to comprise a substantially inactive space, but with slight circulation taking place in that there is some drawing downward of the oil adjacent the inner surface of the bell, such to be replaced in the substantially dead space by oil rising from the emulsion, and above the inlet pipe 16.

The discharge 40 is indicated from substantially the top of the dome 13b, by way of which the dehydrated petroleum oil is delivered for further processing and to be passed on to sales. Such a discharge 40 is indicated in FIG. 1 as bearing a conventional ratio in size to the inlet pipe 16.

A drain pipe 41 is shown in FIG. 1 installed at the bottom of the vessel lower portion 13c; a drain valve 42 being installed in the drain pipe 41. Also, the vessel lower portion or bottom 13c is shown symbolically grounded by a ground 43.

The invention is not limited as to voltage drop per radial inch or per space unit, and there is no specific ratio between the annular area between bell and shell and the annular area between bell and inlet. Also other structures, and combinations of elements are considered which provide for adjustment for concentricity of powered element with relation to grounded inlet and grounded shell. In fact, the invention is not limited by variations of structures providing continued extremely high voltage treatment from emulsion inlet to dehydrated oil passage above the bell electrode, and thus many embodiments, modifications, developments, and variations of forms are considered as long as such may fall within the broad scope of interpretation claimed for, and merited by the appended claims.

What is claimed is:

1. In an electric treater for treating a petroleum emulsion, the combination of a pressure vessel, a tubular, ground electrode extending centrally within said pressure vessel and comprising the emulsion inlet, a highly charged bell shaped electrode to extend substantially concentrically around said ground electrode with the bell top disposed toward, and said highly charged electrode suspended from, the vessel end opposite said inlet end, a step-up transformer to transform line voltage into a substantially higher voltage, a conduit from said transformer to said opposite end and including a vessel adjoining portion in substantially coaxially extended alignment with bell and inlet axis, an insulated conductor extending through an adjustment block substantially axially within said adjoining portion, and with substantial rigidity to carry electrical connection to said bell, a discharge outlet from the top of said vessel, and means accessible from the exterior of said adjoining portion to bear against said block to adjust inlet, bell and vessel concentricity, the lower portion of the bell being perforate over an area extending upwardly from the bottom thereof for a fractional portion of the length of the bell with the perforations increasing in size with increasingly larger perforations lowermost, whereby the emulsion passes for a substantial length of travel between inlet and bell subjected to uniformly adjusted, high voltage intensity de-emulsification and then for a substantial length of travel between bell and vessel also subjected to uniformly adjusted high voltage de-emulsification, as water content of globules settles downwardly and petroleum content of emulsion passes out through said discharge, the velocity of the emulsion decreasing successively in passage downwardly between the emulsion inlet and the bell successively past said increasingly larger perforations and under and back up around the lower end of the bell, whereby the flows of the successive emulsion portions passing through the aforesaid successively larger perforations lowermost and under and back up and around the aforesaid lower end of the bell, are superimposed one upon the other with better settling out of globules from emulsion passing upwardly between the lower portion of the bell and said vessel, and with more uniform upward flow of the emulsion between the upper portion of the bell and out through said discharge outlet.

2. An electric treater as claimed in claim 1 in which the radial distance between said ground electrode and said bell shaped electrode is greater than the radial distance between said bell shaped electrode and said vessel.

3. An electric treater as claimed in claim 1 in which the radial distance between said ground electrode and said bell shaped electrode is substantially equal to the radial distance between said bell shaped electrode and said vessel.

4. An electric treater as claimed in claim 1 in which the radial distance between said ground electrode and said bell shaped electrode is less than the radial distance between said bell shaped electrode and said vessel.

5. An electric treater as claimed in claim 1 in which the voltage concentration across a space unit between said bell shaped electrode and said vessel is less than the voltage concentration across a corresponding space unit between said bell shaped electrode and said ground electrode.

6. An electric treater as claimed in claim 1 in which the voltage concentration across a space unit between said bell shaped electrode and said vessel is substantially equal to the voltage concentration across a corresponding space unit between said bell shaped electrode and said ground electrode.

7. An electric treater as claimed in claim 1 in which the voltage concentration across a space unit between said bell shaped electrode and said vessel is greater than the voltage concentration across a corresponding space unit between said bell shaped electrode and said ground electrode.

8. An electric treater as claimed in claim 1 in which a laboratory model thereof is disposed with axis at 90 degrees to the axis thereof.

9. An electric treater as claimed in claim 1 in which centering means may be adjustably, removably installed with accesibility from the vessel exterior and to extend through the vessel wall and adjustably against the exterior of said bell shaped electrode.

10. An electric treater as claimed in claim 1 in which said perforations are provided through said bell in a plurality of substantially horizontally disposed rows.

References Cited

UNITED STATES PATENTS

| | | | |
|---|---|---|---|
| 1,838,923 | 12/1931 | Fisher | 204—302 |
| 1,838,928 | 12/1931 | Fisher | 204—302 |
| 1,838,934 | 12/1931 | Fisher | 204—302 |
| 1,978,794 | 10/1934 | Van Loenen | 204—302 XR |
| 2,773,827 | 12/1956 | Roper | 204—305 |
| 3,167,402 | 1/1965 | Samuelson et al. | 23—309 |

FOREIGN PATENTS 601,579   5/1948   Great Britain.

WILBUR L. BASCOMB, Jr., Primary Examiner

D. EDWARDS, Assistant Examiner

U.S. Cl. X.R.

196—46; 208—187